(12) United States Patent
Dogra et al.

(10) Patent No.: US 8,362,106 B2
(45) Date of Patent: Jan. 29, 2013

(54) DECARBOXYLATING BLOCK COPOLYMERS

(75) Inventors: Kalindi Dogra, Wilmington, DE (US); Kenneth Gene Moloy, Hockessin, DE (US); Richard Douglas Bauer, Kennett Square, PA (US); David T. Williamson, Chesterfield, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 89 days.

(21) Appl. No.: 12/745,979

(22) PCT Filed: Dec. 3, 2008

(86) PCT No.: PCT/US2008/085366
§ 371 (c)(1),
(2), (4) Date: Jun. 3, 2010

(87) PCT Pub. No.: WO2009/073702
PCT Pub. Date: Jun. 11, 2009

(65) Prior Publication Data
US 2010/0273931 A1      Oct. 28, 2010

Related U.S. Application Data

(60) Provisional application No. 60/992,121, filed on Dec. 4, 2007.

(51) Int. Cl.
| C09D 11/10 | (2006.01) |
| C08L 33/02 | (2006.01) |
| C08L 33/08 | (2006.01) |
| C08L 33/10 | (2006.01) |

(52) U.S. Cl. ............... 523/160; 523/161; 526/328.5; 524/522; 524/556; 525/212; 525/218; 525/221

(58) Field of Classification Search .......... 523/160, 523/161, 522; 524/522, 556; 525/212, 218, 525/221
See application file for complete search history.

(56) References Cited

U.S. PATENT DOCUMENTS

| 4,299,979 | A | 11/1981 | Murphy |
| 5,085,698 | A | 2/1992 | Ma et al. |
| 5,219,945 | A | 6/1993 | Dicker et al. |
| 5,221,334 | A | 6/1993 | Ma et al. |
| 5,416,145 | A | 5/1995 | Askeland et al. |
| 5,519,085 | A | 5/1996 | Ma et al. |
| 5,849,219 | A | 12/1998 | De Laat et al. |
| 6,242,155 | B1 | 6/2001 | Yamasaki et al. |
| 6,399,273 | B1 | 6/2002 | Yamada et al. |
| 6,455,224 | B1 | 9/2002 | Oohashi et al. |
| 2005/0020730 | A1 | 1/2005 | Valentini et al. |
| 2005/0027037 | A1 | 2/2005 | Sato et al. |

FOREIGN PATENT DOCUMENTS

| EP | 0500321 A | 8/1992 |
| WO | 95/28213 A | 10/1995 |

OTHER PUBLICATIONS

STN Search Results (Mar. 9, 2012).*
de Laat et al. Colloid Polym Sci 276: 176-185 (1998).*
International Search Report, Application No. PCT/US2008/085366, Dated Jun. 3, 2009.

(Continued)

Primary Examiner — Vu A Nguyen

(57) ABSTRACT

Linear block copolymers that have at least one hydrophilic block and at least one hydrophobic block, wherein the hydrophilic block of the copolymer has at least one carboxylic acid functionality (or salt thereof) that can readily decarboxylate. These copolymers are useful as binders and/or dispersants in inkjet inks.

10 Claims, 4 Drawing Sheets

OTHER PUBLICATIONS

Huybrechts et al., New Applications of Catalytic Chain Transfer Polymierization to Waterborne Binders for Automotive Paint Systems, Progress in Organic Coatings, 45, (2002), pp. 173-183.

Zhang et al., Multiple Morphologies and Characteristics of Crew-Cut Micelle-Like Aggregates . . . , JACS, 1996, 118, pp. 3168-3181.

Matyjaszewski et al., Preparation of Block Copolymers of Polystyrene and Poly . . . , Journal of Polymer Science:Part A, Polymer Chemistry, 2000, V. 38, pp. 2274-2283.

Gaillard et al., Block Copolymers of Acrylic Acid and Butyl Acrylate Prepared by Reversible Addition . . . , Journal of Polymer Science:Part A, Polymer Chemistry, 2002, V. 41, pp. 684-698.

Frechet et al., Photogenerated Base in Resist and Imaging Materials: Design of Functional Polymers Susceptible to Base Catalyzed Decarboxylation, Chem Mater, 1997, 9, pp. 2887-2893.

Hayashi et al., Palladium(II) Assisted Alkylation of Olefins With Stabilized Carbanions, J. Amer., Soc. 1977, 99, PGSL. 7093-7094.

* cited by examiner

DECARBOXYLATING BLOCK COPOLYMERS

This application claims priority under 35 U.S.C. §119(e) from, and claims the benefit of, U.S. Provisional Application No. 60/992,121, filed Dec. 4, 2007, which is by this reference incorporated in its entirety as a part hereof for all purposes.

TECHNICAL FIELD

This invention is directed to linear block copolymers that have at least one hydrophilic block and at least one hydrophobic block.

BACKGROUND

With more stringent environmental legislation, waterborne coatings are replacing solvent borne coatings. The components in these waterborne coatings are typically anionic vinyl or acrylic polymers and pigment dispersions. Unfortunately, the carboxylate chemical groups and surfactants that allow aqueous solubility or dispersability can also lead to undesirable water sensitivity of the dried coating.

Carboxylated graft and block acrylic copolymer dispersions have better aqueous coalescence stability compared to those with a linear random copolymer of the same molecular weight, polarity, and acid number. The carboxylated graft and block acrylic copolymers also provide superior aqueous flocculation stability of pigment dispersions compared to a linear random acrylic copolymer of the same acid number.

Coating solutions comprising structured carboxylated acrylic polymer dispersions or emulsions and pigment dispersants have high solids at usable viscosities with greater stability than those made with random linear carboxylated copolymers with the same acid number. The lower acid content, and removal of the need for low molecular weight surfactants, also improves the moisture sensitivity of the dried coating.

In spite of the benefits imparted by these carboxylated structured acrylic polymers to aqueous solution stability, the hydrophilic carboxylate groups still remain behind in the coating and can cause problems with moisture sensitivity. Thus, there is still a need for further improvement in moisture resistance of the dried coating.

SUMMARY

This invention is directed to linear block copolymers, comprising at least one hydrophilic block and at least one hydrophobic block, wherein the hydrophilic block of the copolymer comprises at least one carboxylic acid functionality (or salt thereof) that can readily decarboxylate. These copolymers are useful as binders and/or dispersants in inkjet inks.

One embodiment of this invention provides a linear block copolymer, comprising at least one hydrophilic block and at least one hydrophobic block, wherein:

a. the hydrophobic block comprises at least 80 wt % of polymerized ethylenically unsaturated, nonacid-functional monomers, said percentage based on the weight of the hydrophobic block;

b. the hydrophilic block comprises at least 20 wt % of polymerized ethylenically-unsaturated acid-functional monomers, said percentage based on the weight of the hydrophilic block; and c. the hydrophilic block further comprises at least one ethylenically-unsaturated decarboxylating acid-functional monomer having a formula corresponding to Formula 1

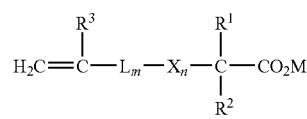

(Formula 1)

wherein
L is a divalent organic linking group which can be a saturated or unsaturated hydrocarbyl group, optionally containing heteroatoms;
X is an electron-withdrawing group selected from the group consisting of —O—, —S—, —Se—, —NR—, —SO$_2$—, —C(=O)—, —OC(=O)—, —S(=O)—, —CCl$_2$—, —CBr$_2$—, —CF$_2$—, and —P(=O)—;
m=0 or 1;
n=0 or 1;
R is H or a monovalent organic group;
R$^1$ is H, a monovalent organic group, or an electron-withdrawing group, Y;
R$^2$ is H or a monovalent organic group;
R$^3$ is H, alkyl or a carboalkoxy group; and
Y is an electron-withdrawing group selected from the group consisting of phenyl, nitro, halo, cyano, carboalkoxy, —C(=O)NH(alkyl), —C(=O)N(alkyl)$_2$, —NH$_2$, and —SO$_2$— aryl;
M is H, Li, K, Cs, NH$_{4-r}$Z$_r$;
where r=0, 1, 2, 3, or 4; and
each Z is independently selected from the group consisting of alkyl, aryl, aralkyl and alkaryl;
with the proviso that when n=0, R$^1$=Y.

Another embodiment of this invention provides a composition comprising the copolymer of this invention, a colorant and an inkjet vehicle comprising water and an optional water-soluble organic solvent.

DETAILED DESCRIPTION

Figure 1:
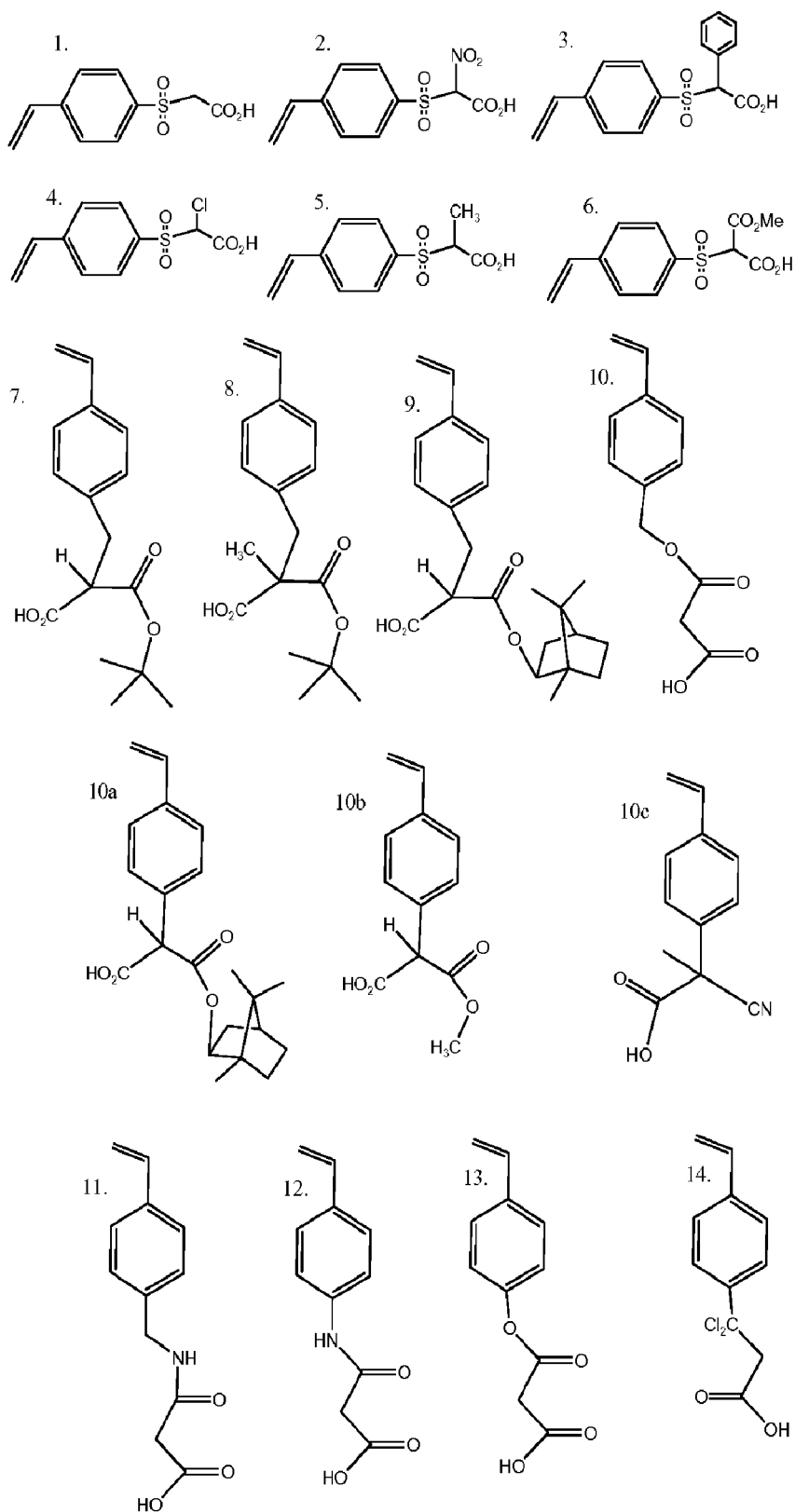
FIG. 1 depicts examples of suitable styrenic decarboxylating monomers.

The copolymers of this invention are linear block copolymers having at least one hydrophilic block (or segment) typically referred to as an "A block" and at least one hydrophobic block (or segment) typically referred to as a "B block". Linear block copolymers can have one hydrophilic and one hydrophobic block ("AB" block copolymer), or more than one hydrophilic block and/or more than one hydrophobic block, for example, as in a "BAB" or an "ABA" block copolymer. The ratio of hydrophilic block to hydrophobic block is 10:90 to 90:10 by weight, preferably from about 20:80 to about 50:50.

The weight average molecular weight of the polymer is 500 to 150,000, preferably 1,000 to 100,000.

A hydrophilic block comprises polymerized hydrophilic monomers having acid functionality. The hydrophilic blocks confer aqueous solubility on the copolymer. With regard to the monomers, "acid-functional" also includes the neutralized or salt form thereof. Of the monomers comprising the hydrophilic block, from 20-100% by weight are acid-functional monomers. The balance typically comprises nonionic hydrophilic monomers.

At least one of the acid-functional monomers is a decarboxylatable monomer. The acid functional monomers can be comprised entirely of decarboxylatable monomers or a combination of decarboxylatable monomers and other acid-functional monomers.

The decarboxylatable monomers of this invention contain functional groups (carboxylic acids or carboxylate salts) that can decarboxylate upon heating at temperatures of 50° C.-200° C. Decarboxylation of the copolymers is typically promoted by the presence of electron-withdrawing groups on the alpha carbon of the carboxylic acid (or carboxylate salt form thereof). Monomers with carboxylate groups that are not activated by such electron-withdrawing groups typically require temperatures in excess of 225° C. for significant decarboxylation to occur. For example, decarboxylation of solid polyacrylic acid by programmed heating requires temperatures of 250° C. and above.

When the functional group eliminates $CO_2$, the copolymer becomes less hydrophilic and consequently the coating becomes less water-soluble. The carboxylate components of the copolymer of this invention are sufficiently stable to decarboxylation in aqueous solution at ambient temperature to give solutions with a useful shelf life.

Suitable decarboxylatable monomers include ethylenically-unsaturated decarboxylating acid-functional monomers of Formula 1

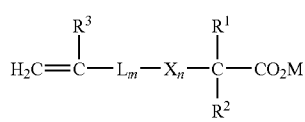

Formula 1 wherein
L is a divalent organic linking group which can be a saturated or unsaturated hydrocarbyl group, optionally containing heteroatoms;
X is an electron-withdrawing group selected from the group consisting of —O—, —S—, —Se—, —NR—, —$SO_2$—, —C(=O)—, —OC(=O)—, —S(=O)—, —$CCl_2$—, —$CBr_2$—, —$CF_2$—, and —P(=O)—;
m=0 or 1;
n=0 or 1;
R is H or a monovalent organic group;
$R^1$ is H, a monovalent organic group, or an electron-withdrawing group, Y;
$R^2$ is H or a monovalent organic group;
$R^3$ is H, alkyl or a carboalkoxy group; and
Y is an electron-withdrawing group selected from the group consisting of phenyl, nitro, halo, cyano, carboalkoxy, —C(=O)NH(alkyl), —C(=O)N(alkyl)$_2$, —$NH_2$, and —$SO_2$— aryl;
M is H, Li, K, Cs, $NH_{4-r}Z_r$;
where r=0, 1, 2, 3, or 4; and
each Z is independently selected from the group consisting of alkyl, aryl, aralkyl and alkaryl;
with the proviso that when n=0, $R^1$=Y.

Suitable monovalent organic groups include hydrocarbyls, where a "hydrocarbyl" is a univalent group formed by removing a hydrogen atom from a hydrocarbon.

Suitable decarboxylating monomers include the monomers shown in FIGS. 1-4.

Acid functional monomers other than decarboxylating monomers, include, for example, acrylic acid, methacrylic acid, itaconic acid, acrylamidomethylpropane sulfonic acid, maleic acid, and styrene sulfonic acid.

Suitable nonionic hydrophilic monomers that can be incorporated into the hydrophilic block include hydroxy- and amine-containing monomers such as 2-hydroxyethyl(meth)acrylate; hydroxypropyl(meth)acrylate; 2-dimethylaminoethyl(meth)acrylate; and 2-diethylaminoethyl(meth)acrylate. The terminology "(meth)acrylate" is used for convenience to mean the monomer can be either the acrylate or methacrylate derivative. Nonionic hydrophilic monomers include monomers with oligo-ether moieties of the general formula:

wherein
$R^4$=H or methyl;
$R^5$=alkyl of 1 to 4 carbon atoms; aryl of 6 to 12 carbon atoms; or alkyl-aryl of 7-16 carbon atoms;
and p=1 to 20.

Suitable nonionic hydrophilic monomers include ethoxyethyl(meth)acrylate; 2-(2-methoxyethoxy)ethyl(meth)acrylate; 2-ethoxytriethylene glycol(meth)acrylate; methoxy polyethyleneglycol monomethacrylate (molecular weight of 200 to 4000, preferably 200 to 2000); and polyethyleneglycol monomethacrylate (molecular weight 200 to 4000, preferably 200 to 2000).

A hydrophobic block is hydrophobic in comparison with the hydrophilic block and comprises predominately "nonacid-functional" monomers, which are monomers other than acid functional monomers. The hydrophobic block is generally insoluble in aqueous media, but can associate to form micelles and can be more strongly adsorbed to the surface of pigments. Of the monomers comprising the hydrophobic block, at least 80% by weight of the hydrophobic block are nonacid-functional monomers.

Nonacid-functional monomers include hydrophobic monomers. Suitable hydrophobic monomers include, for example, ethylenically unsaturated monomers derived from acrylic or methacrylic acid including: alkyl, aryl, and alkyl aryl(meth)acrylates having 1-12 carbon atoms in the alkyl group and/or 6-12 carbons in the aryl group. The "aryl" and "alkylaryl" can contain one or more substituents such as ester, acyloxy, nitrile, halogen, haloalkyl, or alkoxy. Suitable monomers include methyl(meth)acrylate; ethyl(meth)acrylate; butyl(meth)acrylate; propyl(meth)acrylate; isobutyl (meth)acrylate; hexyl(meth)acrylate; 2-ethyl hexyl(meth) acrylate; nonyl(meth)acrylate; lauryl(meth)acrylate; isobornyl(meth)acrylate; benzyl(meth)acrylate; phenyl (meth)acrylate; 2-phenylethyl(meth)acrylate; 2-phenoxyethyl(meth)acrylate; 2-phenoxyethyl methacrylate; 1-naphthalyl(meth)acrylate; 2-naphthalyl(meth)acrylate; p-nitrophenyl(meth)acrylate; and phthalimidomethyl(meth) acrylate.

Suitable hydrophobic monomers also include N-aryl acrylamide, N-aryl methacrylamide and vinyl aryl esters. Specific examples include N-phenyl(meth)acrylamide, N-benzyl (meth)acrylamide, N-(2-phenylethyl)(meth)acrylamide, vinyl benzoate, and N-(2-phthalimidoethoxymethyl)acrylamide.

Suitable hydrophobic monomers also include polymerizable vinyl aromatic monomers such as styrene, alpha-methyl styrene, vinyl toluene, and aliphatic hydrocarbon monomers such as isoprene and butadiene.

The hydrophobic block can also contain up to 20 wt % of hydrophilic monomers, including decarboxylating monomers, to adjust the hydrophobicity/hydrophilicity balance of the copolymer.

The copolymers of this invention are useful, for example, for forming coatings and as binders in ink jet inks.

Other than the decarboxylating monomers, the monomers referred to herein above are generally available commercially.

Preparation of the decarboxylating block copolymers of this invention can be accomplished by radical polymerization, anionic polymerization, cationic polymerization, GTP (Group Transfer Polymerization), RAFT (reversible addition-fragmentation chain transfer polymerization), ATRP (Atom Transfer Radical Polymerization), NMP (nitroxyl mediated polymerization), or chain extension of macromonomers by methacrylates. Any of these methods can be adopted for the preparation of decarboxylating copolymers by incorporating the decarboxylating monomers described above, or protected forms of the decarboxylating monomers that can be cleaved to the acid or acid salt after preparation of the polymer. In some instances, the acid-functional monomer is incorporated into the polymer as a protected ester, and the ester group can be cleaved after the polymer has been made. Suitable examples of protected esters include methyl esters, tert-butyl esters, benzyl esters, and siloxane esters. The carboxylate group can also be part of a cyclic isopropylidene ester, which could be opened by amines and alcohols prior to or after polymerization to provide a decarboxylating functional group.

GTP cannot be performed in the presence of carboxylic acids. However, the preparation of decarboxylating AB or BAB block copolymers by GTP can be achieved by using protected forms of the decarboxylating monomers. The polymers thus formed can then be deprotected so as to enable the thermal decarboxylation. The method of preparation would be analogous to that described in U.S. Pat. No. 5,085,698. Such decarboxylating copolymers are useful for making decarboxylating pigment dispersions. The preparation of ABC triblock acrylic decarboxylating polymers can be prepared by GTP as described in U.S. Pat. No. 5,519,085. When acid monomers are used in GTP, the acid function is first protected, preferably with an easily hydrolyzable group such as a trimethylsilane, tert-butyl, tetrahydropyranyl, or benzyl group. These protecting groups are removed after polymerization to make the acid or salt of the decarboxylating monomers.

Decarboxylating linear block acrylic copolymers can be prepared by polymerizing methacrylate monomers with a catalytic chain transfer decarboxylating macromonomer. The block copolymer formation results from an addition-fragmentation mechanism that builds the hydrophobic block with methacrylate monomers. The preparation is analogous to the preparation of conventional acid-containing block copolymers, as described by J. Huybrechts et al., Progress in Organic Coatings, 45, (2002) 173-183.

Decarboxylating linear block copolymers can be made by anionic polymerization. Polystyrene-block-poly(decarboxylating acid) polymers suitable for this invention can be prepared by anionic polymerization of styrene and a protected ester of a decarboxylating acid, followed by hydrolysis of the protected ester, in analogy to the polymer preparations described by Zhang and Eisenberg in JACS, 1996, 118, 3168-3181.

The preparation of decarboxylating block vinyl copolymers can be achieved by atom transfer radical polymerization. Examples of copolymers that can be prepared by this method include block copolymers, comb polymers derived from macromonomers, and star polymers. Salts or protected forms of the decarboxylating monomers are used in the polymerization to avoid interference with the catalyst. Suitable acid protecting groups include trimethylsilane, tert-butyl, tetrahydropyranyl, and benzyl groups. These are removed after polymerization to prepare the acid or salt forms of the carboxylating structures. Polystyrene-block-poly(decarboxylating acid) polymers suitable for this invention can be prepared by ATRP of styrene and a protected ester of a decarboxylating acid, followed by hydrolysis of the protected ester, in analogy to the polymer preparations described by Matyjaszewski et al, in Journal of Polymer Science: Part A: Polymer Chemistry, Vol 38, 2274-2283.

The preparation of decarboxylating linear block vinyl copolymers can be achieved by reversible addition fragmentation chain transfer polymerization. Examples of the copolymers that can be prepared by this method include block copolymers, star polymers, and gradient polymers. The decarboxylating monomers can be incorporated into these polymerizations as the free acid, salt, or protected acids as described earlier.

Block copolymers of decarboxylating acids and butyl acrylate can be made by analogy to the by RAFT polymerization described by Gaillard et al, in Journal of Polymer Science: Part A: Polymer Chemistry, Vol. 41, 684-698 to make block copolymers of butyl acrylate and acrylic acid.

The copolymers of this invention are soluble or dispersible in water. Solubility or dispersibility of the copolymers is achieved by incorporating monomers with decarboxylating functionality. After the aqueous formulation is applied to a substrate, decarboxylation can be effected, making the copolymer significantly less sensitive to moisture.

The copolymers can contain hydrophilic monomers other than decarboxylating monomers. However, incorporation of too many such monomers will result in a polymer that remains water-sensitive even after decarboxylation. In a preferred embodiment, the inventive copolymer is soluble in water "as made" and is insoluble in water after decarboxylation. In another preferred embodiment, the inventive polymer is stably dispersible in water "as made" and nondispersible (not stably dispersible) in water after decarboxylation.

Decarboxylating functionalities are activated to decarboxylation by the presence of one or more electron-withdrawing groups on the alpha carbon of the carboxylic acid (or carboxylate salt form thereof). Examples of useful electron-withdrawing groups include carboxyl, ester, amide, nitro, trihalomethyl, keto, aryl and substituted aryl groups. The rate of decarboxylation is affected by both the kind of electron-withdrawing group and by other substituents on the alpha carbon atom. The choice of electron-withdrawing group(s) can make the rate of decarboxylation "tunable" to the rate required for the particular application, while maintaining the stability of the copolymer at room temperature for good storage properties.

Studies with model decarboxylatable acids such as 2-(butoxycarbonyl)acetic acid, 2-(butoxycarbonyl)propanoic acid, 2-(butoxycarbonyl)-2-methyl propanoic acid, 1-(butoxycarbonyl)cyclopropane carboxylic acid, 2-(butoxycarbonyl)-2-phenylacetic acid, and 2-(butylcarbamoyl)acetic acid, demonstrate that decarboxylation half-lives are sensitive to the nature of the electron-withdrawing group. The half-lives for these six acids vary from 15 min at 40° C. to 1560 min at 150° C.

Another model carboxylic acid, phenylsulfonylacetic acid, and various salts thereof were thermally decarboxylated in the solid state and monitored by TGA (thermogravimetric analysis). The peak temperature of $CO_2$ evolution ranged from 267° C. for the acid form to 106° C. when the counterion was $DBUH^+$ demonstrating a significant counterion effect. $DBUH^+$ is the protonated form of DBU (1,8-diazabicycloundecene).

The rate of decarboxylation and temperature needed to effect a useful rate of decarboxylation can vary. In a suitable decarboxylating functionality, the half-life for decarboxylation is typically no more than 30 minutes at 200° C., and is preferably less than 30 minutes at 160° C. A most preferred decarboxylation rate is one that leads to complete decarboxylation within a few seconds at 150-200° C., a time and temperature range similar to that to fix electrophotographic and laser printer images. The rate of decarboxylation of a dry sample can be followed, for example, in a standard thermogravimetric analyzer.

FIG. 1 depicts examples of suitable styrenic decarboxylating monomers. In this and FIGS. 2-4, the carboxylate group is shown in the acid form, but can also be a salt, or an ester that is cleaved after polymerization to an acid or salt in the polymer. The carboxylate group can also be part of a cyclic isopropylidene ester structure that can be opened by amines and alcohols prior to or after polymerization to provide a decarboxylating structure. The preparations of monomers 1 through 6 are described in U.S. Pat. No. 6,242,155. The preparation of monomers 7, 8, 9, and 10, 10a, 10b are described in U.S. Pat. No. 6,399,273. The preparation of monomer 10c is described by Frechet in Chem. Mater. 1997, 9, 2887.

Figure 2:
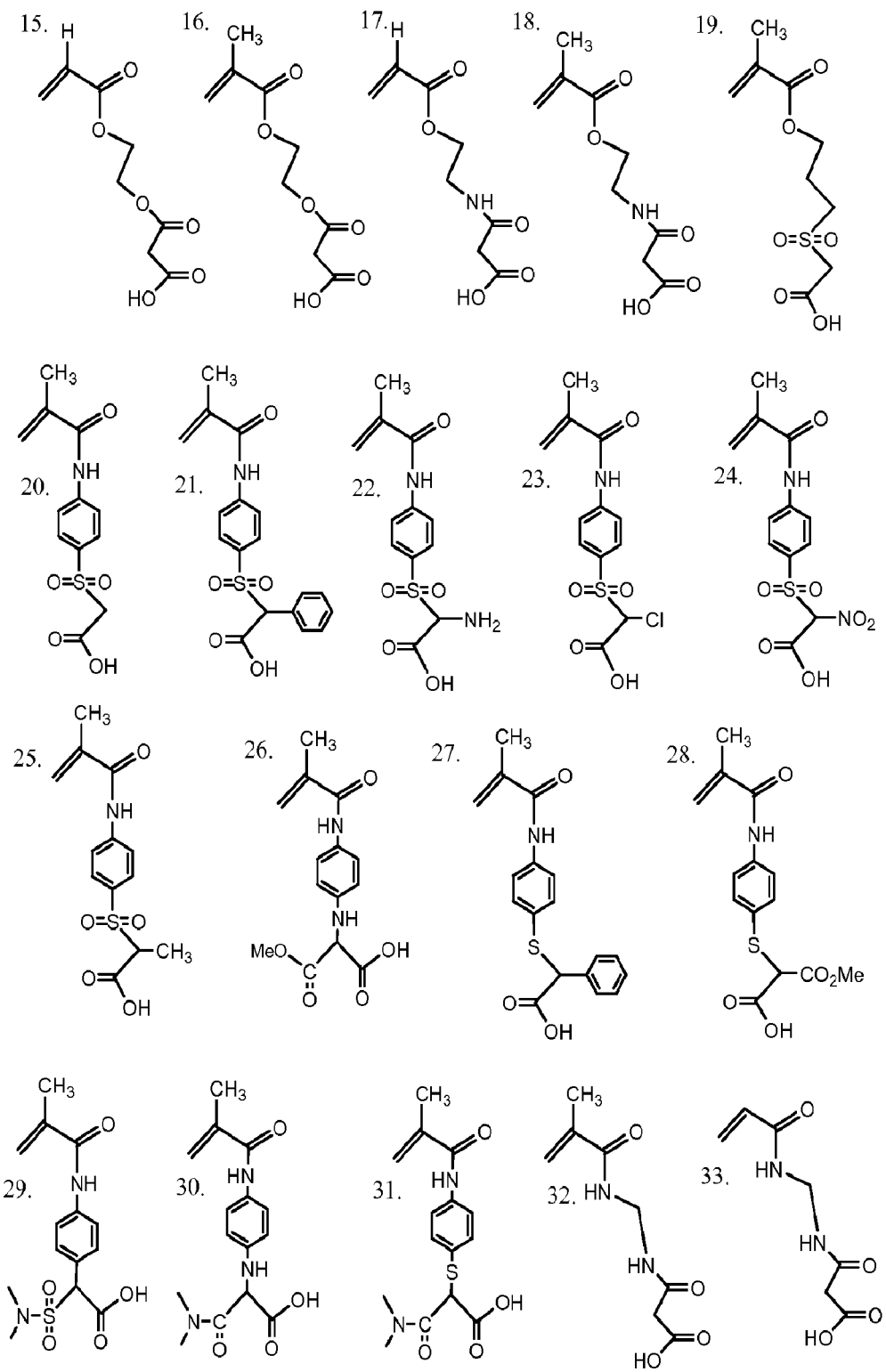
FIG. 2 depicts examples of suitable acrylate and acrylamide decarboxylating monomers.

FIG. 2 depicts examples of suitable acrylate and acrylamide decarboxylating monomers. The preparation of monomers 19 through 28 are described in U.S. Pat. No. 6,242,155. The preparation of monomer 33 is described in U.S. Pat. No. 4,299,979.

Figure 3:
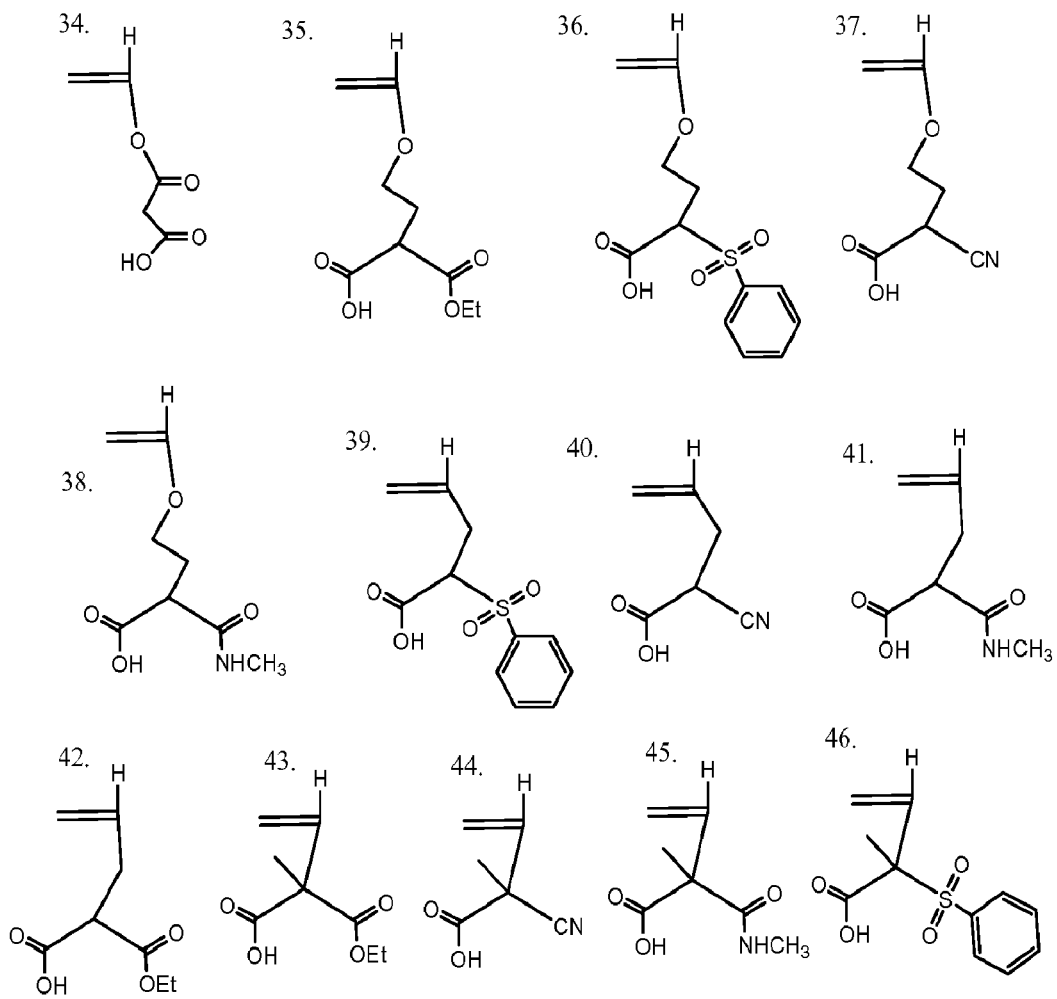
FIG. 3 depicts examples of suitable vinyl, vinyl ether, and vinyl ester decarboxylating monomers.
Figure 4:
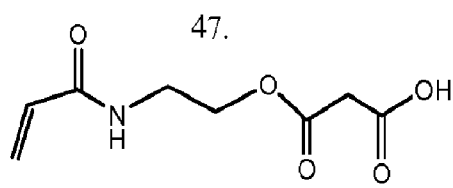
FIG. 4 depicts additional examples of suitable decarboxylating monomers.
Figure 4:
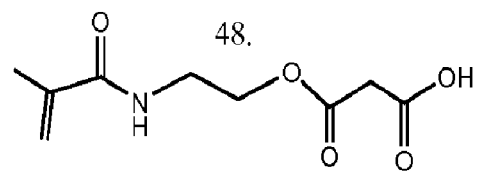
Figure 4:
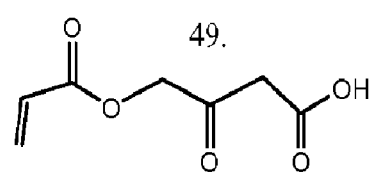
Figure 4:
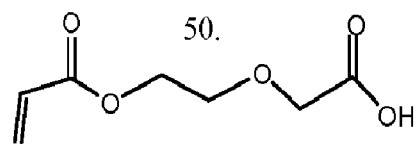
Figure 4:
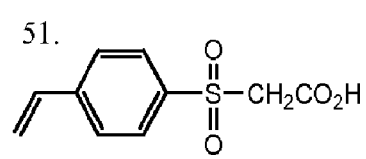
Figure 4:
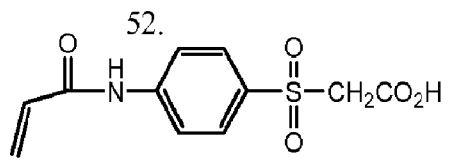

FIG. 3 depicts examples of suitable vinyl, vinyl ether, and vinyl ester monomers. The preparation of the ethyl ester of monomer 34 is described in JP 470114 and by Inukai in Kogyo Kagaku Zasshi (1968), 71(1) 162. After polymerization, the ester can be cleaved by base to yield the copolymer with decarboxylating acid or salt. The preparation of the diethyl malonate analog of monomer 35 is described in U.S. Pat. No. 5,849,219; monomers 36, 37 and 38 can be prepared by an analogous route. Allylic monomers 39 through 42 can be prepared by alkylation of the corresponding half esters, followed by cleavage of the ester groups to the acids or salts before or after radical polymerization. Vinyl monomers 43 through 46 can be prepared by analogy to the method described by Hayashi, T.; Hegedus, L. S. J. Amer. Chem. Soc. 1977, 99, 7093.

The decarboxylating block copolymers of this invention are useful as binder additives and/or dispersants in the formulation of compositions such as inkjet inks. Inkjet inks in accordance with the present invention comprise an aqueous vehicle, a decarboxylating block copolymer, and optionally other additives. The inkjet ink can be substantially colorless, or can be colored by further comprising a colorant.

An "aqueous vehicle" refers to a vehicle comprised of water or a mixture of water and at least one water-soluble organic solvent (co-solvent) or humectant. Selection of a suitable mixture depends on requirements of the specific application, such as desired surface tension and viscosity, the selected colorant, and compatibility with substrate onto which the ink will be printed.

Examples of suitable water-soluble organic solvents and humectants include: alcohols, ketones, keto-alcohols, ethers, thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol and polypropylene glycol; triols such as glycerol and 1,2,6-hexanetriol; lower alkyl ethers of polyhydric alcohols, such as ethylene glycol monomethyl ether, ethylene glycol monoethyl ether, diethylene glycol monomethyl, and diethylene glycol monoethyl ether; lower dialkyl ethers of polyhydric alcohols, such as diethylene glycol dimethyl or diethyl ether; urea and substituted ureas.

An aqueous vehicle will typically contain about 30% to about 95% water with the balance (i.e. about 70% to about 5%) being the water-soluble solvent. Ink compositions typically contain about 60% to about 95% water, based on the total weight of the aqueous vehicle.

Other ingredients (additives) can be formulated into an inkjet ink, to the extent that such other ingredients do not interfere with the stability and jettability of the finished ink, which may be readily determined by routine experimentation. Additives include, for example, surfactants to adjust surface tension, polymers additives for durability, biocides to inhibit growth of microorganisms, and buffers to maintain pH.

Colored inks comprise colorant in addition to the other components of the formulation. The colorants can be soluble (dye) or dispersed (pigment) in the ink vehicle and are typically referred to by their "C.I." designation established by Society Dyers and Colourists, Bradford, Yorkshire, UK and published in The Color Index, Third Edition, 1971, unless otherwise indicated.

Useful dyes include (cyan) Acid Blue 9 and Direct Blue 199; (magenta) Acid Red 52, Reactive Red 180, Acid Red 37, and CI Reactive Red 23; (yellow) Direct Yellow 86, Direct Yellow 132 and Acid Yellow 23; and, (black) Direct Black 168, Food Black 2, and Direct Black 31. Useful pigments include (cyan) Pigment Blue 15:3 and 15:4; (magenta) Pigment Red 122; (yellow) Pigment Yellow 128, Pigment Yellow 95, Pigment Yellow 155 and Pigment Yellow 74; and (black) carbon black. The pigment particle size is typically from about 0.005 micron to about 15 micron. Preferably, the pigment particle size is from about 0.005 to about 5 micron, or from about 0.005 to about 1 micron, or from about 0.005 to about 0.3 micron.

Pigments are typically stabilized to dispersion in a vehicle by dispersing agents, such as polymeric dispersants or surfactants, or by surface treatment to be "self-dispersible" or "self-dispersing" pigments (hereafter "SDP").

Inkjet inks comprising pigments dispersed with block copolymer dispersants are described, for example, in U.S. Pat. Nos. 5,085,698, 5,219945, 5,221,334 and 5,519,085. In a preferred embodiment of the present invention, an inkjet ink comprises polymer-dispersed pigment colorant and a decarboxylating block copolymer as prescribed herein as the dispersant.

Inkjet inks comprising colorant and block copolymer additives are described, for example, in U.S. Pat. No. 5,416,145 and U.S. Patent Appl. No. 2005/0020730. In another preferred embodiment of this invention, an inkjet ink comprises a colorant and a decarboxylating block copolymer as prescribed herein as an additive.

The amount of vehicle in an ink is typically in the range of from about 70% to about 99.8%, and more typically from about 80% to about 99%. Colorant is generally present in colored inks in amounts up to about 10%. The decarboxylating block copolymer, when used as a binder additive, will typically be present at levels of at least about 0.1% up to about 25%, and more typically in the range of about 0.5% to about 20%. Percentages are weight percent of the total weight of ink.

Drop velocity, separation length of the droplets, drop size and stream stability are greatly affected by the surface tension and the viscosity of the ink. Ink jet inks typically have a surface tension in the range of about 20 mN·m$^{-1}$ to about 50 mN·m$^{-1}$ at 25° C. Viscosity can be as high as 30 mPa·s at 25° C., but is typically in the range of about 1 mPa·s to about 20 mPa·s at 25° C. The ink physical properties are adjusted to the ejecting conditions and printhead design. Preferred pH for the ink is in the range of from about 6.5 to about 8.

The inks of the present invention can be utilized by printing with any suitable inkjet printer. Substrates suitable for use in the present invention can be any useful substrate known to those of ordinary skill in the relevant art. For example, the substrate can be plain paper such as common electrophotographic copier paper. The substrate can also be specialty media such as microporous papers, polymer-coated papers and hybrids of the two. The substrate can be polymeric film such as vinyl chloride or polyester. Polymeric films are especially useful in wide-format applications such as signs, billboards and banners. The substrate can be a non-woven textile such as spun-bonded polyolefin (e.g. Tyvek® from DuPont). The substrate can also be woven textile such as silk, cotton, nylon or polyester.

The inks will typically be applied with the inventive polymers in their native form (non-decarboxylated). After application of the ink, decarboxylation treatment (e.g., applying heat) to the printed area induces decarboxylation of the polymers and thereby cause the inks to become more water-resistant.

Monomers suitable for incorporation in a copolymer of this invention as an ethylenically-unsaturated decarboxylating acid-functional monomer include without limitation the various monomers that are described as Compounds 1~52 in FIGS. 1~4. Monomers suitable for incorporation in a copolymer of this invention may also, however, be any one or more of those members of a subgroup of the total group of Compounds 1~52 where the subgroup is formed by excluding any one or more other members from the total group of Compounds 1~52. As a result, the suitable monomers in such instance may not only be any one or more of the monomers in any subgroup of any size that may be selected from the total group of Compounds 1~52 in all the various different combinations of individual members of that total group, but the members in any such subgroup may thus also be identified by, and used in, the absence of the one or more of the members of the total group of Compounds 1~52 that have been excluded to form the subgroup.

EXAMPLE

The advantageous attributes and effects of the copolymers hereof may be more clearly appreciated from a practical example as described below. The embodiments of this invention on which the example is based are representative only, and the selection of those embodiments to illustrate the invention does not indicate that materials, components, reactants, ingredients, configurations or designs not described in this example are not suitable for making and using these copolymers, or that subject matter not described in this examples is excluded from the scope of the appended claims and equivalents thereof.

This example illustrates the preparation and use of the decarboxylating diblock copolymer BA//BA/MAHEA, where "BA" means butyl acrylate and "MAHEA" means the malonic acid half-ester of hydroxyethylacrylate. The hydrophobic block is the BA homopolymer block (separated by the "//"), and the hydrophilic block is the BA/MAHEA copolymer block. MAHEA is a decarboxylating monomer. The decarboxylating block acrylic copolymer was prepared by RAFT polymerization. The copolymer was converted to a triethyl amine salt and used to prepare a carbon black dispersion.

MAHEA was prepared by adding hydroxyethylacrylate (20.0 g, Aldrich Chemical Co., St. Louis Mo.) malonic acid (18.0 g, Aldrich Chemical Co.) and acetonitrile (350 mL) to a 500 mL round-bottomed flask. 2-Methoxy-hydroquinone (0.039 g, Aldrich Chemical Co.) was added to the solution. The solution was cooled to 0° C. Dicyclohexylcarbodiimide (35.6 g, Aldrich Chemical Co.) was dissolved in acetonitrile (100 mL) and added dropwise to the 0° C. solution over a period of 2 hr. Dicyclohexyl urea was removed via filtration. 2-pyrrolidinone (70 mL) was added to the solution. Acetonitrile was removed from the filtrate in vacuo to yield a solution of the MAHEA monomer in 2-pyrrolidinone.

A BA//BA/MAHEA diblock copolymer was prepared by combining Perkadox® 16 (2.25 g, Akzo Nobel Chemicals, Inc.), a branched trithiocarbonate RAFT agent, $C_{12}H_{25}SC(S)SC(CH_3)(CN)CH_2CH_2CO_2H$ (3.76 g, WO2005113493), a solution of MAHEA (34.2 g at a molality of 1.77 in acetonitrile), and butyl acrylate (0.42 g) in a 100 mL round-bottomed flask. The resulting solution was heated to 60° C. under nitrogen for 12 hr. Additional butylacrylate (7.26 g) was then added and the reaction was allowed to proceed for 3 hr. The solution was allowed to cool. Triethylamine (6 g) was added and the solution was stirred for 5 min. The copolymer solution was added to toluene (500 mL) to precipitate the copolymer. The precipitated copolymer was collected via filtration. The resulting diblock copolymer (19.98 g) was then dissolved in 2-pyrrolidinone (34.2 g) and used as a dispersant/binder for a carbon black pigment in an ink formulation.

The BA//BA/MAHEA diblock polymer in 2-pyrrolidinone (4.7 g of the diblock solution prepared above) was added to water (11.5 g), sand (15 g), Nopco NDW defoamer (0.1 g, Henkel/Cognis), Nipex 180 carbon black pigment (2 g, Degussa), and 3.5 g of 2-pyrrolidinone. The slurry was vigorously shaken for 10 min to disperse the pigment, and then filtered to remove the sand. The filtrate is the ink. The ink viscosity was determined to be 4.80 cps at 25° C. The median particle size was determined to be 126 nm, with 90% of the particles less than 280 nm. The ink was drawn-down on Boise X-9 Copy/Multipurpose paper. The durability was tested by single, double, and triple marking with acidic and basic highlighter markers before and after heating the inked paper at 180° C. for 10 min to decarboxylate the copolymer. The resistance of the image to the highlighter markings was dramatically improved after decarboxylation.

What is claimed is:

1. A linear block copolymer comprising at least one hydrophilic block and at least one hydrophobic block, wherein:
   a. the hydrophobic block comprises at least 80 wt % of polymerized ethylenically unsaturated, nonacid-functional monomers, said percentage based on the weight of the hydrophobic block;
   b. the hydrophilic block comprises at least 20 wt % of polymerized ethylenically-unsaturated acid-functional monomers selected from the group consisting of acrylic acid, methacrylic acid, acrylamidomethylpropane sulfonic acid, itaconic acid, maleic acid and styrene sulfonic acid, said percentage based on the weight of the hydrophilic block; and c. the hydrophilic block further comprises at least one ethylenically-unsaturated decarboxylating acid-functional monomer having a formula corresponding to Formula 1

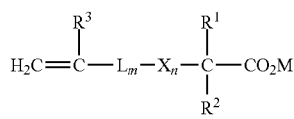

Formula 1 wherein

L is a divalent organic linking group which can be a saturated or unsaturated hydrocarbyl group, optionally containing heteroatoms;

X is an electron-withdrawing group selected from the group consisting of —O—, —S—, —Se—, —NR—, —SO$_2$—, —C(=O)—, —OC(=O)—, —S(=O)—, —CCl$_2$—, —CBr$_2$—, —CF$_2$—, and —P(=O)—;

m = 0 or 1;

n = 0 or 1;

R is H or a monovalent organic group;

R$^1$ is H, a monovalent organic group, or an electron-withdrawing group, Y;

R$^2$ is H or a monovalent organic group;

R$^3$ is H, alkyl or a carboalkoxy group; and

Y is an electron-withdrawing group selected from the group consisting of phenyl, nitro, halo, cyano, carboalkoxy, —C(=O)NH(alkyl),—C(=O)N(alkyl)$_2$, —NH$_2$, and —SO$_2$—aryl;

M is H, Li, K, Cs, NH$_{4-r}$Z$_r$;

where r = 0, 1, 2, 3, or 4; and each Z is independently selected from the group consisting of alkyl, aryl, aralkyl and alkaryl;

with the proviso that when n=0, R$^1$=Y.

2. The copolymer of claim 1 having a number average molecular weight of 500 to 1,000,000.

3. The copolymer of claim 1 wherein the hydrophobic block is comprised of at least 90 wt % of polymerized ethylenically unsaturated, nonacid-functional monomers.

4. The copolymer of claim 1 wherein the nonacid-functional monomers are selected from the group consisting of methyl (meth)acrylate; ethyl (meth)acrylate; butyl (meth)acrylate; propyl (meth)acrylate; isobutyl (meth)acrylate; hexyl (meth)acrylate; 2-ethyl hexyl (meth)acrylate; nonyl (meth)acrylate; lauryl (meth)acrylate; isobornyl (meth)acrylate; benzyl (meth)acrylate; phenyl (meth)acrylate; 2-phenylethyl (meth)acrylate; 2-phenoxyethyl (meth)acrylate; 1-naphthalyl acrylate; 2-naphthalyl (meth) acrylate; p-nitrophenyl (meth) acrylate; phthalimidomethyl (meth)acrylate; N-phenyl (meth)acrylamide; N-benzyl (meth)acrylamide; N-(2-phenylethyl) acrylamide; N-(2-phthalimidoethoxymethyl) acrylamide; styrene; alpha-methyl styrene; vinyl toluene; isoprene; and butadiene.

5. The copolymer of claim 1 wherein the ethylenically-unsaturated decarboxylating acid-functional monomer is selected from the group of monomers consisting of Compounds 1-14

1. 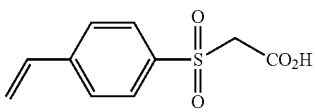

2. 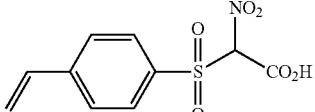

3. 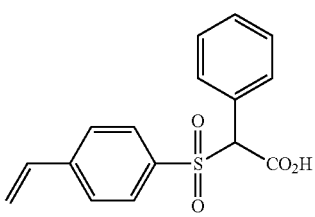

4. 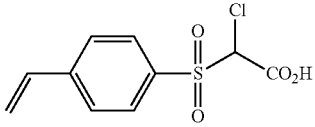

5. 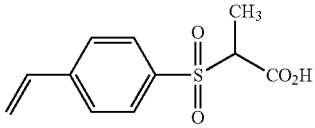

6. 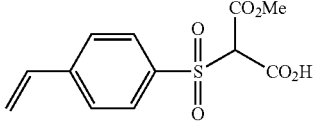

7. 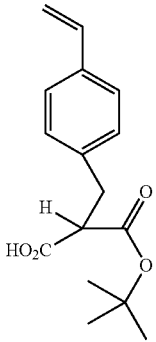

8. 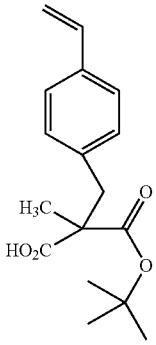

9. 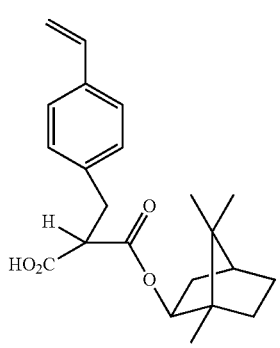
10. 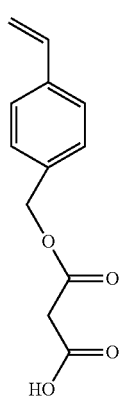
10a. 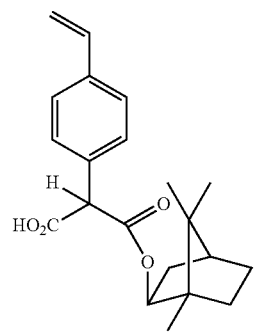
10b. 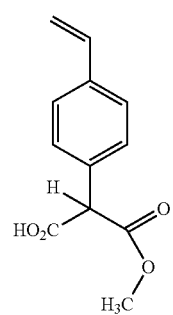
10c. 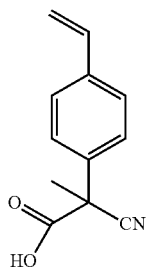
11. 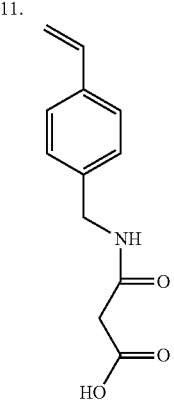
12. 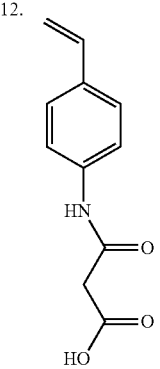
13. 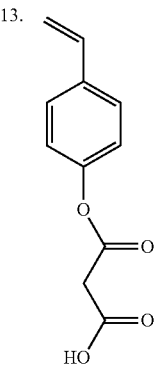

-continued
14.
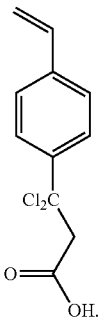
6. The copolymer of claim 1 wherein the ethylenically-unsaturated decarboxylating acid-functional monomer is selected from the group of monomers consisting of Compounds 15-33
15.
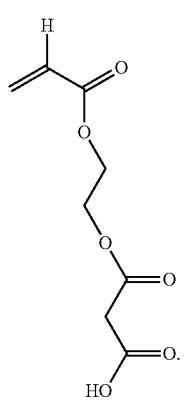
16.
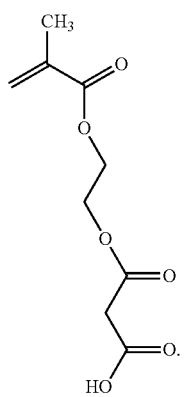
-continued
17.
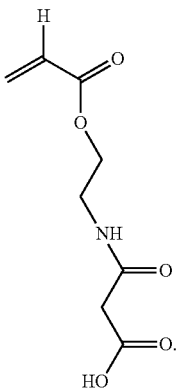
18.
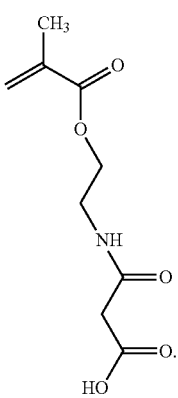
19.
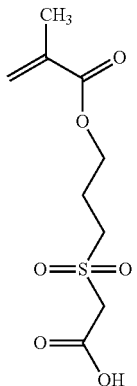
20.
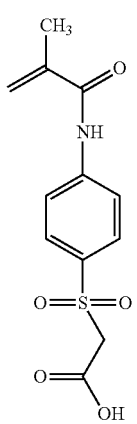

-continued
21. 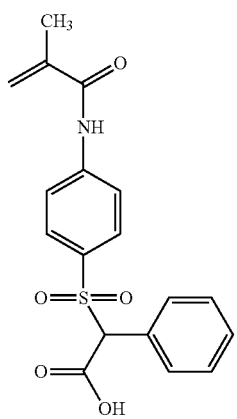
22. 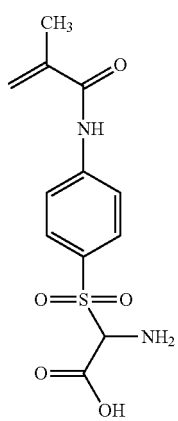
23. 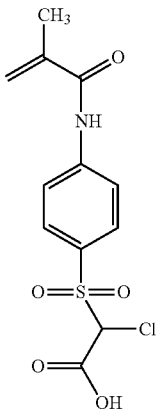
24. 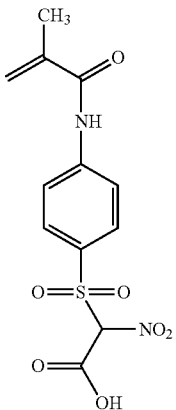
25. 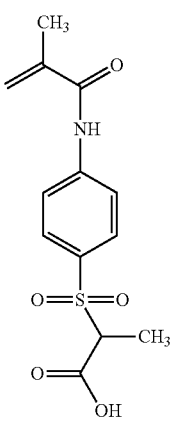
26. 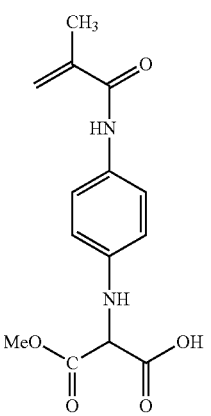
27. 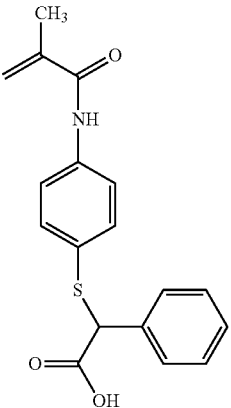
28. 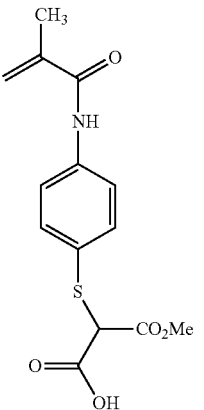

29. 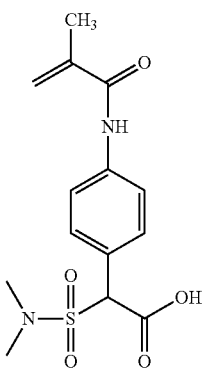
30. 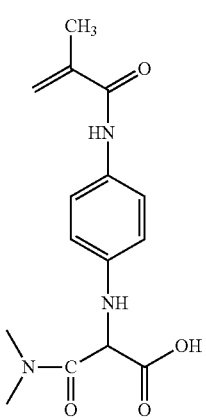
31. 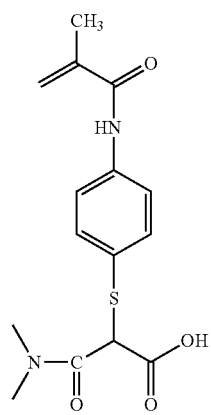
32. 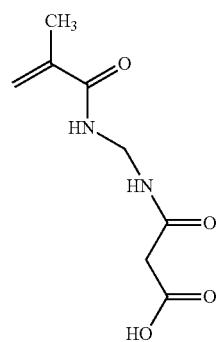
33. 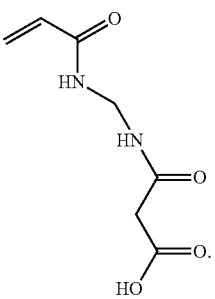
7. The copolymer of claim 1 wherein the ethylenically-unsaturated decarboxylating acid-functional monomer is selected from the group of monomers consisting of Compounds 34-46
34. 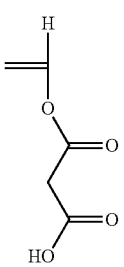
35. 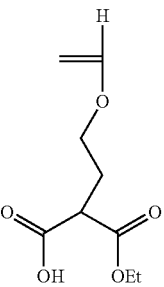
36. 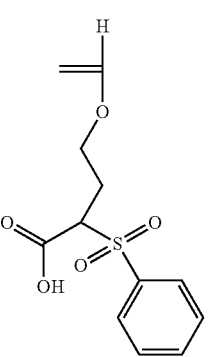

37. 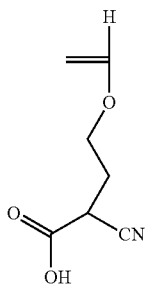
38. 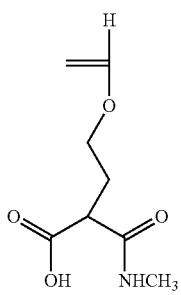
39. 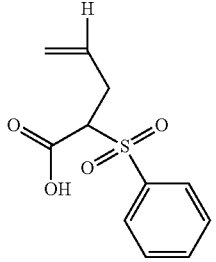
40. 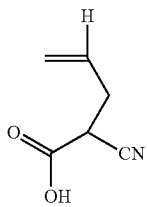
41. 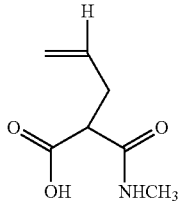
42. 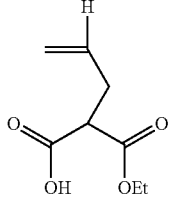
43. 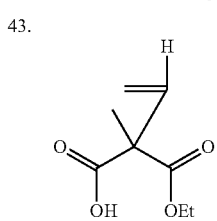
44. 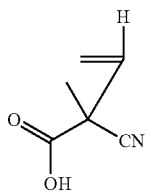
45. 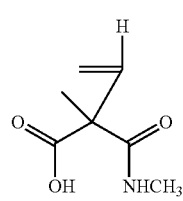
46. 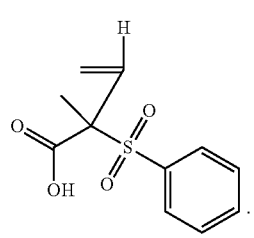
8. The copolymer of claim 1 wherein the ethylenically-unsaturated decarboxylating acid-functional monomer is selected from the group of monomers consisting of Compounds 47-52
47. 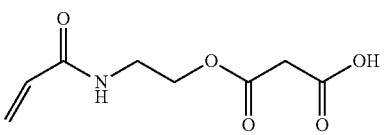
48. 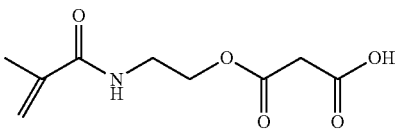
49. 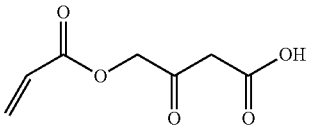
50. 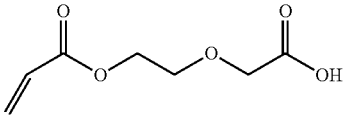

51.

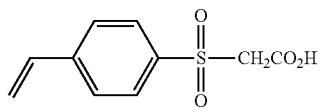

52.

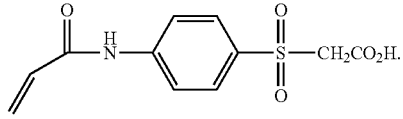

9. A copolymer produced by heating the copolymer of claim 1 between about 50° C. and 200° C.

10. An inkjet ink comprising (a) a copolymer comprising at least one hydrophilic block and at least one hydrophobic block, wherein:
(i) the hydrophobic block comprises at least 80 wt % of polymerized ethylenically unsaturated, nonacid-functional monomers, said percentage based on the weight of the hydrophobic block;
(ii) the hydrophilic block comprises at least 20 wt % of polymerized ethylenically-unsaturated acid-functional monomers, said percentage based on the weight of the hydrophilic block; and
(iii) the hydrophilic block further comprises at least one ethylenically-unsaturated decarboxylating acid-functional monomer having a formula corresponding to Formula 1

Formula 1

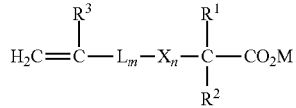

wherein
L is a divalent organic linking group which can be a saturated or unsaturated hydrocarbyl group, optionally containing heteroatoms;

X is an electron-withdrawing group selected from the group consisting of —O—, —S—, —Se—, —NR—, —$SO_2$—, —C(=O)—, —OC(=O)—, —S(=O)—, —$CCl_2$—, —$CBr_2$—, —$CF_2$—, and —P(=O)—;

m = 0 or 1;

n = 0 or 1;

R is H or a monovalent organic group;

$R^1$ is H, a monovalent organic group, or an electron-withdrawing group, Y;

$R^2$ is H or a monovalent organic group;

$R^3$ is H, alkyl or a carboalkoxy group; and

Y is an electron-withdrawing group selected from the group consisting of phenyl, nitro, halo, cyano, carboalkoxy, —C(=O)NH(alkyl), —C(=O)N(alkyl)$_2$, —$NH_2$, and —$SO_2$-aryl;

M is H, Li, K, Cs, $NH_{4-r}Z_r$;

where r = 0, 1, 2, 3, or 4; and each Z is independently selected from the group consisting of alkyl, aryl, aralkyl and alkaryl;

with the proviso that when n=0, $R^1$=Y, (b) a colorant, and (c) an inkjet vehicle comprising water, or a mixture of water and at least one water-soluble organic solvent.

\* \* \* \* \*